(12) United States Patent
Jeoung et al.

(10) Patent No.: US 7,701,542 B2
(45) Date of Patent: Apr. 20, 2010

(54) LIQUID CRYSTAL DISPLAY DEVICE WITH DATA SWITCHING THIN FILM TRANSISTOR FOR INSPECTION AND INSPECTION METHOD THEREOF

(75) Inventors: Hun Jeoung, Gyeongsangbuk-do (KR); Sang Ho Kim, Chungcheongnam-do (KR)

(73) Assignee: LG Display Co., Ltd., Seoul (KR)

( * ) Notice: Subject to any disclaimer, the term of this patent is extended or adjusted under 35 U.S.C. 154(b) by 909 days.

(21) Appl. No.: 11/299,662

(22) Filed: Dec. 13, 2005

(65) Prior Publication Data

US 2006/0285053 A1 Dec. 21, 2006

(30) Foreign Application Priority Data

Jun. 15, 2005 (KR) .................. 10-2005-0051650

(51) Int. Cl.
G02F 1/1345 (2006.01)
G01R 31/00 (2006.01)

(52) U.S. Cl. ...................................... 349/149; 324/770

(58) Field of Classification Search ................. 324/770; 349/149
See application file for complete search history.

(56) References Cited

U.S. PATENT DOCUMENTS

| 6,784,862 B2 * | 8/2004 | Kodate et al. ................. 345/92 |
| 7,274,352 B2 * | 9/2007 | Yu .............................. 345/100 |
| 2004/0174183 A1 * | 9/2004 | Nojiri et al. .................. 324/770 |

FOREIGN PATENT DOCUMENTS

CN 1499467 A 5/2004

* cited by examiner

*Primary Examiner*—Andrew Schechter
(74) *Attorney, Agent, or Firm*—Holland & Knight LLP

(57) ABSTRACT

A liquid crystal display device includes a pixel matrix where a plurality of gate lines and a plurality of data lines cross each other and a plurality of liquid crystal cells are arranged, first data switching thin film transistors respectively connected to data lines of a first group of the data lines, and second data switching thin film transistors respectively connected to data lines of a second group of the data lines.

8 Claims, 7 Drawing Sheets

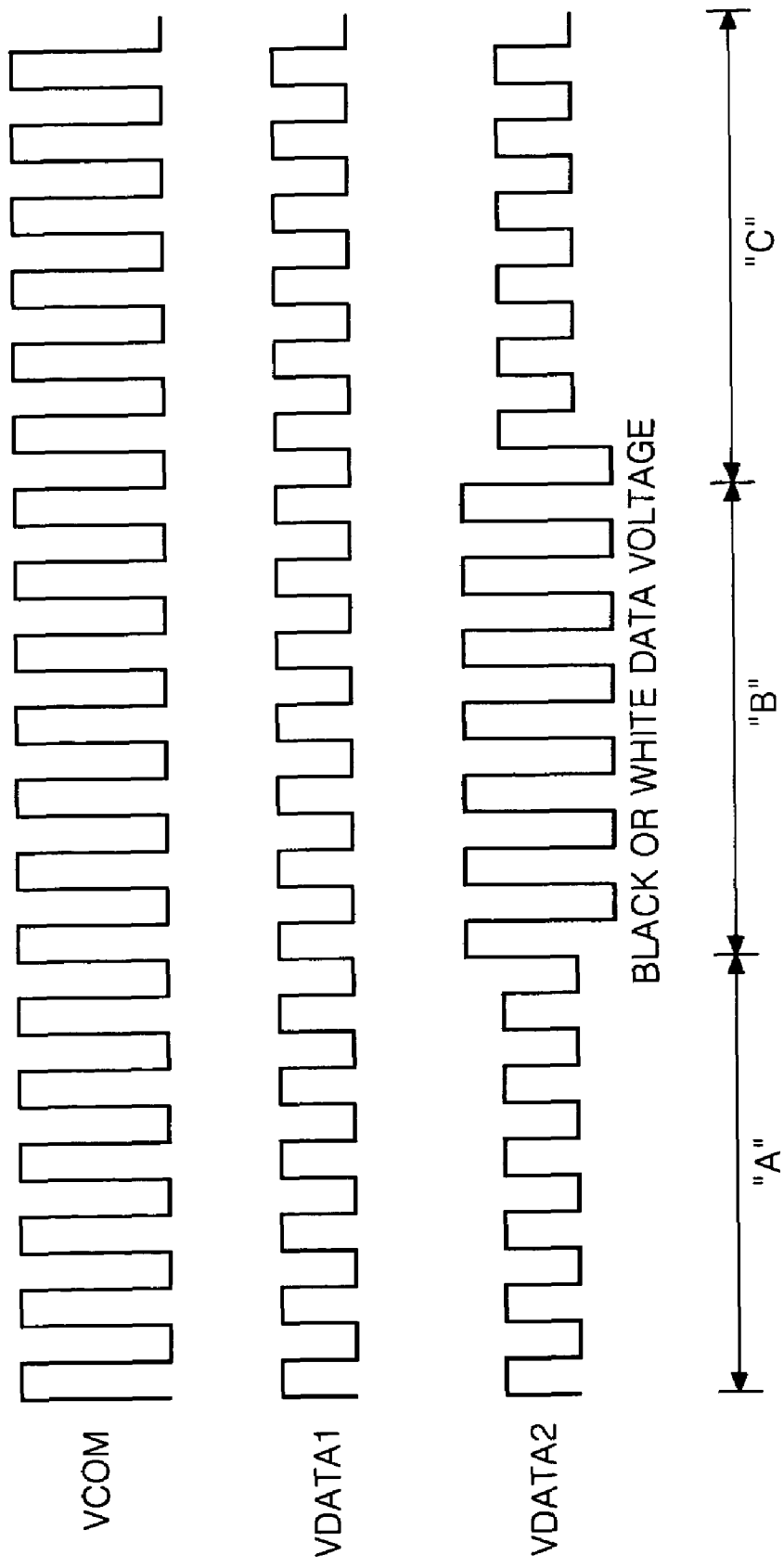

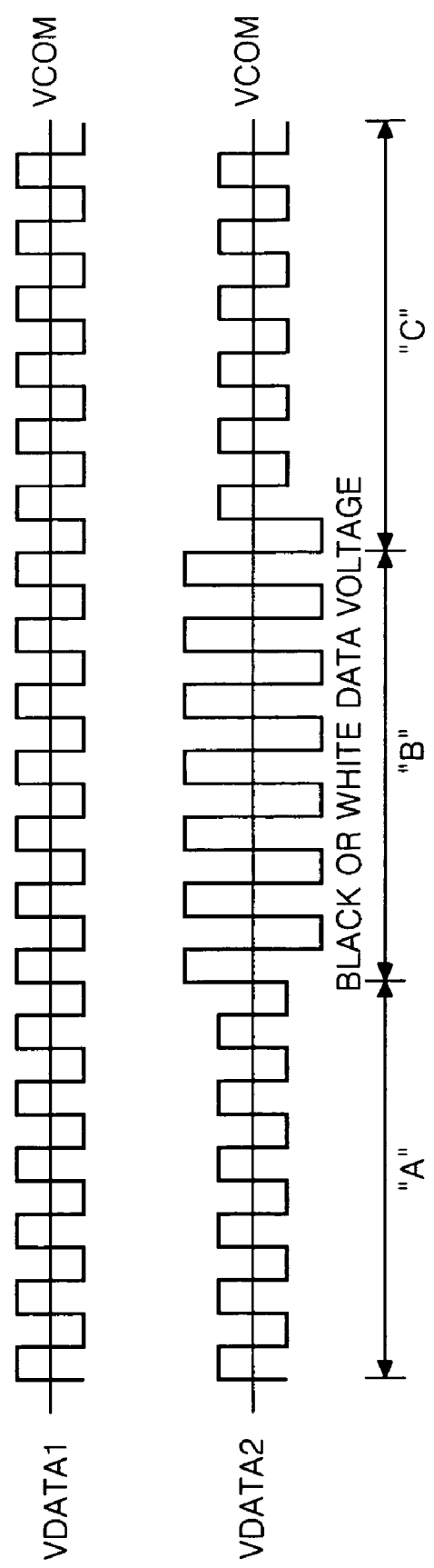

LIQUID CRYSTAL DISPLAY DEVICE WITH DATA SWITCHING THIN FILM TRANSISTOR FOR INSPECTION AND INSPECTION METHOD THEREOF

This application claims the benefit of the Korean Patent Application No. P2005-051650 filed on Jun. 15, 2005 which is hereby incorporated by reference in its entirety.

BACKGROUND OF THE INVENTION

1. Field of the Invention

The present invention relates to a liquid crystal display device, and more particularly to a liquid crystal display device and testing method thereof. Although the present invention is suitable for a wide scope of applications, it is particularly suitable for increasing yield by preventing an unnecessary waste of parts.

2. Description of the Related Art

As the information society develops, the importance of a display device as a visual information transmission medium increases. A cathode ray tube (CRT) or Braun tube is currently the typical display device. However, the CRT has problems in that its weight and size are too large. Unlike the CRT, various types of flat panel display devices have been developed are light-weight and have a thin profile. These types of flat panel display devices include liquid crystal display (LCD), field emission display FED, plasma display panel PDP, electro-luminescence EL, and other types of flat panel devices that are practical to use and on the market.

The liquid crystal display device can satisfy the current trend in electronic devices of being thin, light-weight, and small. As the efficiency in the productivity in LCD devices improves, LCD devices will rapidly supersedes the cathode ray tube in a many applications.

In general, there are two types of LCDs. The first type is an active matrix LCD and the second type is a passive matrix type. In a passive matrix type LCD, each of the cells are switched externally. In the active matrix type LCD, each of the cell are switched internally by a thin film transistor (TFT). The active matrix type LCD has advantages in that picture quality is excellent and power consumption is low. Further, the active matrix type LCD can be manufactured so as to have a large size and to have high resolution due to a recent advances in mass production technology, which resulted from research and development. A process for fabricating the active matrix type LCD can be divided into substrate cleaning, substrate patterning, alignment film forming/rubbing, substrate bonding/liquid crystal injecting, mounting, inspecting and repairing. In the substrate cleaning process, impurities contaminated in a substrate surface are removed with a cleaning solution.

The substrate patterning process is divided into an upper substrate (or color filter substrate) patterning and lower substrate (or TFT-array substrate) patterning. A color filter, a common electrode and a black matrix are formed on an upper substrate in the upper substrate patterning. A signal wire lines, such as data lines and gate lines, are formed on a lower substrate, and a cell thin film transistor (hereinafter, referred to as "cell TFT") is formed adjacent to a crossing of the data line and the gate line in the lower substrate patterning. And, a pixel electrode is formed at a pixel area between the gate line and the data line connected to a source electrode of the cell TFT.

In the alignment film forming/rubbing process, an alignment film is formed on at least one of the upper substrate and the lower substrate. Then, the alignment film is rubbed with a rubbing cloth. If alignment films are formed on both of the substrates, the alignment films are rubbed in the same direction.

In the substrate bonding/liquid crystal injecting process, the upper substrate and the lower substrate are bonded with a sealant. Then, a liquid crystal and a spacer are injected through a liquid crystal injection hole in the sealant. Subsequently, a sealing process is performed on the liquid crystal injection hole.

In the mounting process of the liquid crystal display panel, a tape carrier package (hereinafter, referred to as "TCP") on which an integrated circuit, such as a gate drive integrated circuit and a data drive integrated circuit are mounted, is connected to a pad part of the lower substrate. The drive integrated circuit can also be directly mounted on the lower substrate by a chip-on-glass (hereinafter, referred to as "COG") method other than a tape automated bonding method.

The inspecting process includes an electrical inspection performed after forming the various signal lines and the pixel electrode on the lower substrate; an electrical inspection performed after the substrate bonding/liquid crystal injecting process; and macrography inspection.

The repairing process performs restoration of a substrate or panel, which is judged to be repairable during the inspecting process. On the other hand, defective substrates which are judged to be unrepairable in the inspecting process are disposed as a waste.

The electrical inspection after the substrate bonding/liquid crystal injecting process is mainly composed of a picture quality inspection that includes a cross-talk inspection and a brightness inspection of each gray level. The electrical inspection is performed when a data drive circuit and a gate drive circuit are connected to the signal line of the TFT array substrate, as shown in FIGS. 1 and 2.

As shown in FIG. 1, an inspecting method of the related art connects a data switching TFT (hereinafter, referred to as "Tdata") to lower ends of the data lines DL. Further, the related art inspecting method attaches a gate switching TFT (hereinafter, referred to as "Tgate") for supplying an inspection gate pulse to the gate lines at the same time in the gate lines GL. Furthermore, another switching TFT (hereinafter, referred to as "Tmuxe") is connected to the top ends of the data lines DL of a pixel matrix array in which the liquid crystal cells Clc and the cell TFT's are formed, to act to supply a data voltage, which is supplied from output terminals of the data drive circuit 10 of the TCP or COG A set of external contact pads 11 includes a MUX1 pad, a MUX2 pad and a MUX3 pad for controlling the Tmuxes; a VEGATE pad for supplying a voltage to a gate terminal of the Tgate; a VGATE pad for supplying a gate high voltage and a gate low voltage to a source terminal of the Tgate; a VEDATA pad for supplying a voltage to a gate terminal of the Tdata; and a VDATA pad for supplying a test data voltage to source terminals of the Tdatas.

If the set of the external contact pads 11 is connected to output terminals of a test jig, a test data voltage can be supplied to the data lines DL through the VDATA pad via Tdata, and a gate high voltage is supplied to the gate lines GL through the VGATE pad via the Tgate. As a result, the TFT's of the pixel array are turned on so as to apply the test data voltage to the liquid crystal cells, thereby enabling inspection of whether there is a gray level expression defect in any of the liquid crystal cells.

During this inspecting method, the gate drive circuits 13 in a TCP can be attached to the liquid crystal display panel, as shown in FIG. 2, to sequentially supply a gate pulse to the gate lines GL, thereby sequentially selecting the liquid crystal cells of a horizontal line to which the test data voltage is to be supplied. Further, for inspecting the cross-talk, the inspecting method of the related art displays a mid gray level on the outer perimeter with black on the inside followed by white in the pixel matrix array of the liquid crystal display panel, as shown in FIG. 3. Thus, at least two different test data are supplied to the data lines DL, but the same data cannot be supplied to the data lines by the VDATA via Tdata formed in the liquid crystal display panel of FIGS. 1 and 2. Accordingly, a data drive circuit 10 is connected to the Tmux of the liquid crystal display panel in a COG or TCP form. In other words, according to the related art inspecting method, when performing the cross-talk inspection, the data drive circuit must be attached to the liquid crystal display panel in the TCP or COG form to determine whether or not there is a cross-talk defect. However, it is inevitable that the TCP or COG attached to the liquid crystal display panel, which is judged to be defective by a cross-talk inspection, will have to be discarded because it is attached to a defective liquid crystal display panel. Thus, data drive circuits will be wasted and thus decrease overall yield of data drive circuits.

SUMMARY OF THE INVENTION

Accordingly, the present invention is directed to a liquid crystal display device and testing method thereof that substantially obviates one or more of the problems due to limitations and disadvantages of the related art.

An object of the present invention to provide a liquid crystal display device that increases yield by preventing an unnecessary waste of parts for a cross-talk inspection.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a liquid crystal display device includes a pixel matrix where a plurality of gate lines and a plurality of data lines cross each other and a plurality of liquid crystal cells are arranged, first data switching thin film transistors respectively connected to data lines of a first group of the data lines, and second data switching thin film transistors respectively connected to data lines of a second group of the data lines.

In another aspect, a liquid crystal display device includes a pixel matrix where a plurality of gate lines and a plurality of data lines cross each other and a plurality of liquid crystal cells are arranged, a gate drive circuit for supplying a scan pulse to the gate lines, first data switching thin film transistors respectively connected to a first group of the data lines, second data switching thin film transistors respectively connected to a second group of the data lines, a first external wire line connected to data input terminals of the first data switching thin film transistors, a second external wire line connected to data input terminals of the second data switching thin film transistors, a third external wire line connected to control terminals of the first and second data switching thin film transistors, a first external pad for supplying first data to the first external wire line, a second external pad for supplying second data to the second external wire line; and a third external pad for supplying control data to the third external wire line.

An inspection method of a liquid crystal display device according to another aspect of the present invention includes the steps of forming a pixel matrix in which a plurality of gate lines and a plurality of data lines cross each other and a plurality of liquid crystal cells are arranged, first data switching thin film transistors respectively connected to data lines of a first group of the data lines, second data switching thin film transistors respectively connected to data lines of a second group of the data lines, a first external wire line connected to data input terminals of the first data switching thin film transistors, a second external wire line connected to data input terminals of the second data switching thin film transistors, a third external wire line connected to control terminals of the first and second data switching thin film transistors, a first external pad for supplying first data to the first external wire line, a second external pad for supplying second data to the second external wire line, and a third external pad for supplying control data to the third external wire line, connecting a gate drive circuit for supplying a scan pulse to the gate lines to the gate lines, and supplying the first and second data to the external pads to display a window pattern on the pixel matrix and judging whether there is a cross-talk defect.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a driving waveform diagram of line inversion for realizing the test window pattern shown in FIG. 5;

FIG. 7 is a driving waveform diagram of dot inversion for realizing the test window pattern shown in FIG. 5.

DETAILED DESCRIPTION OF THE PREFERRED EMBODIMENTS

Reference will now be made in detail to the preferred embodiments of the present invention, examples of which are illustrated in the accompanying drawings. With reference to FIGS. 4 to 7, embodiments of the present invention will be explained as follows.

Figure 1:
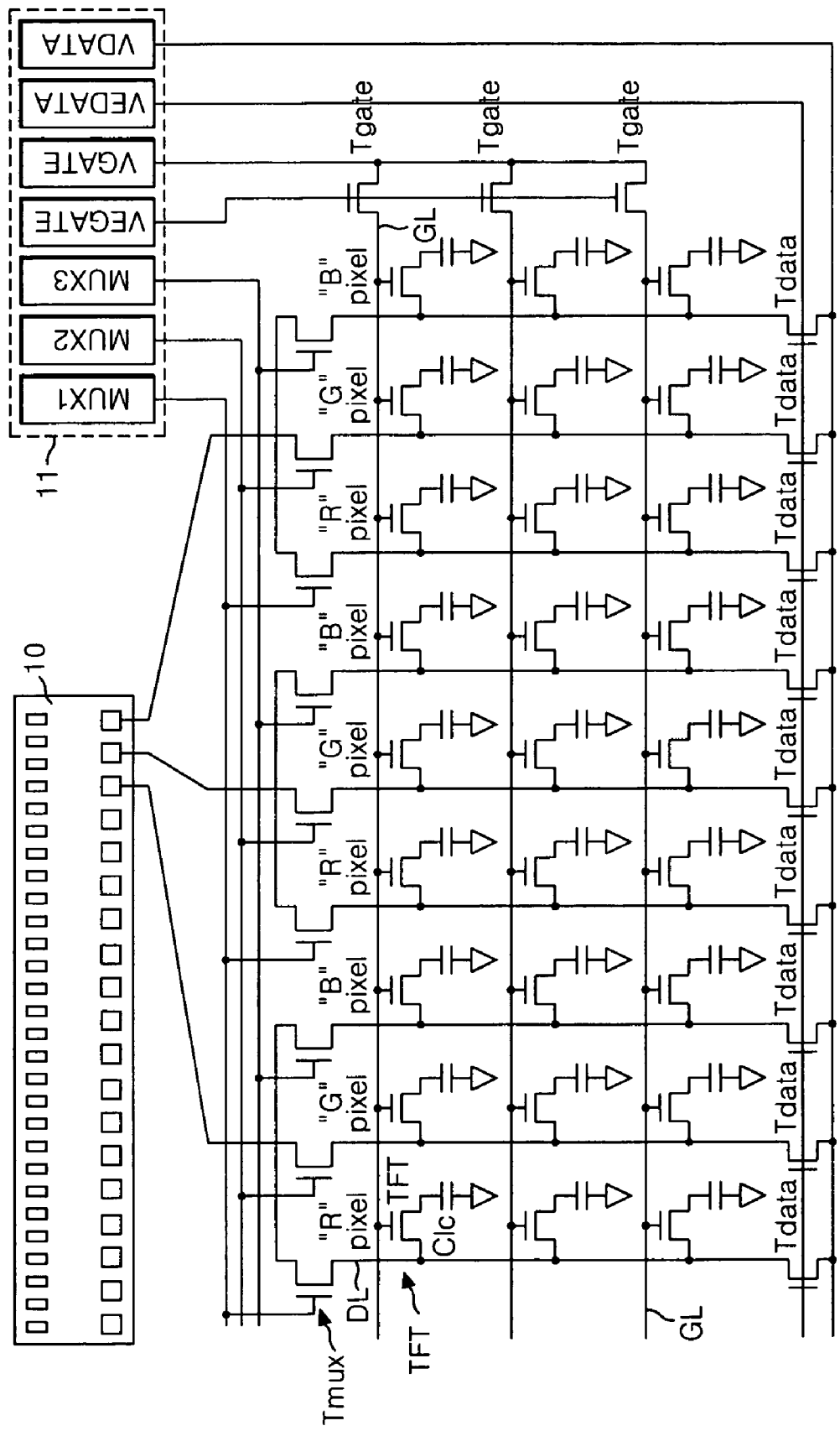
FIG. 1 is a plan view of a related art liquid crystal display panel.
Figure 2:
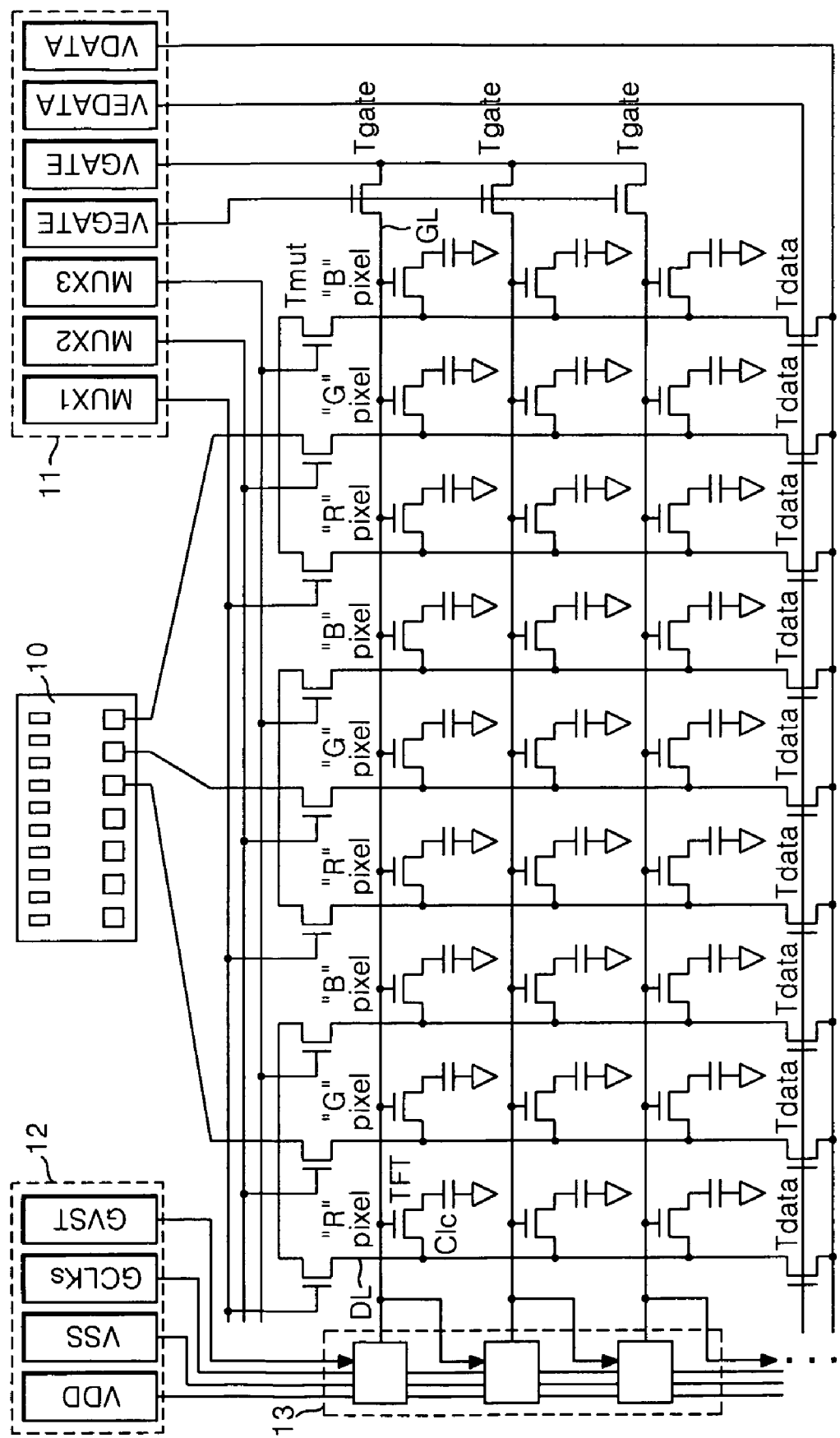
FIG. 2 is a plan view of another related art liquid crystal display panel.
Figure 3:
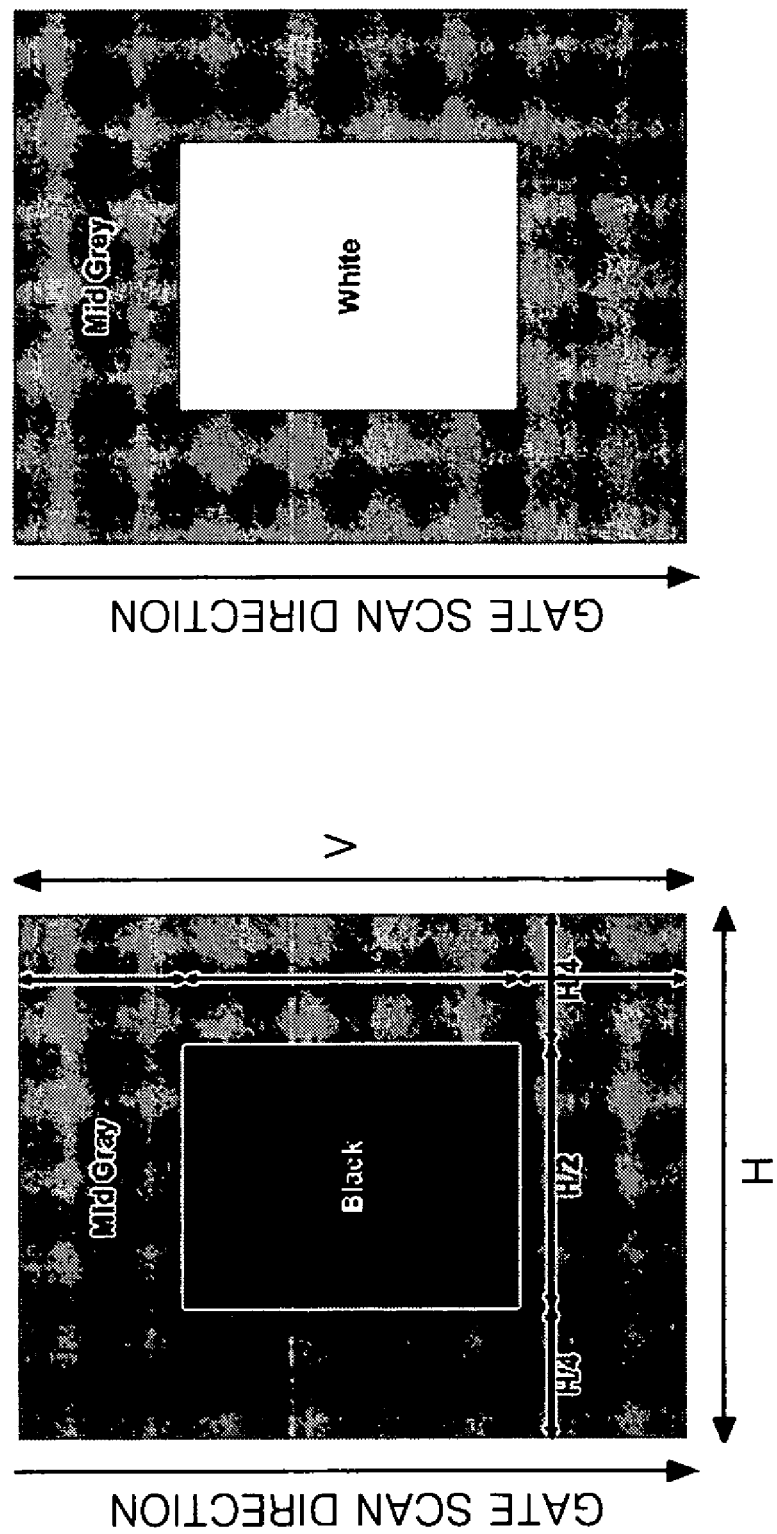
FIG. 3 is a diagram representing a test window pattern for cross-talk inspection.
Figure 4:
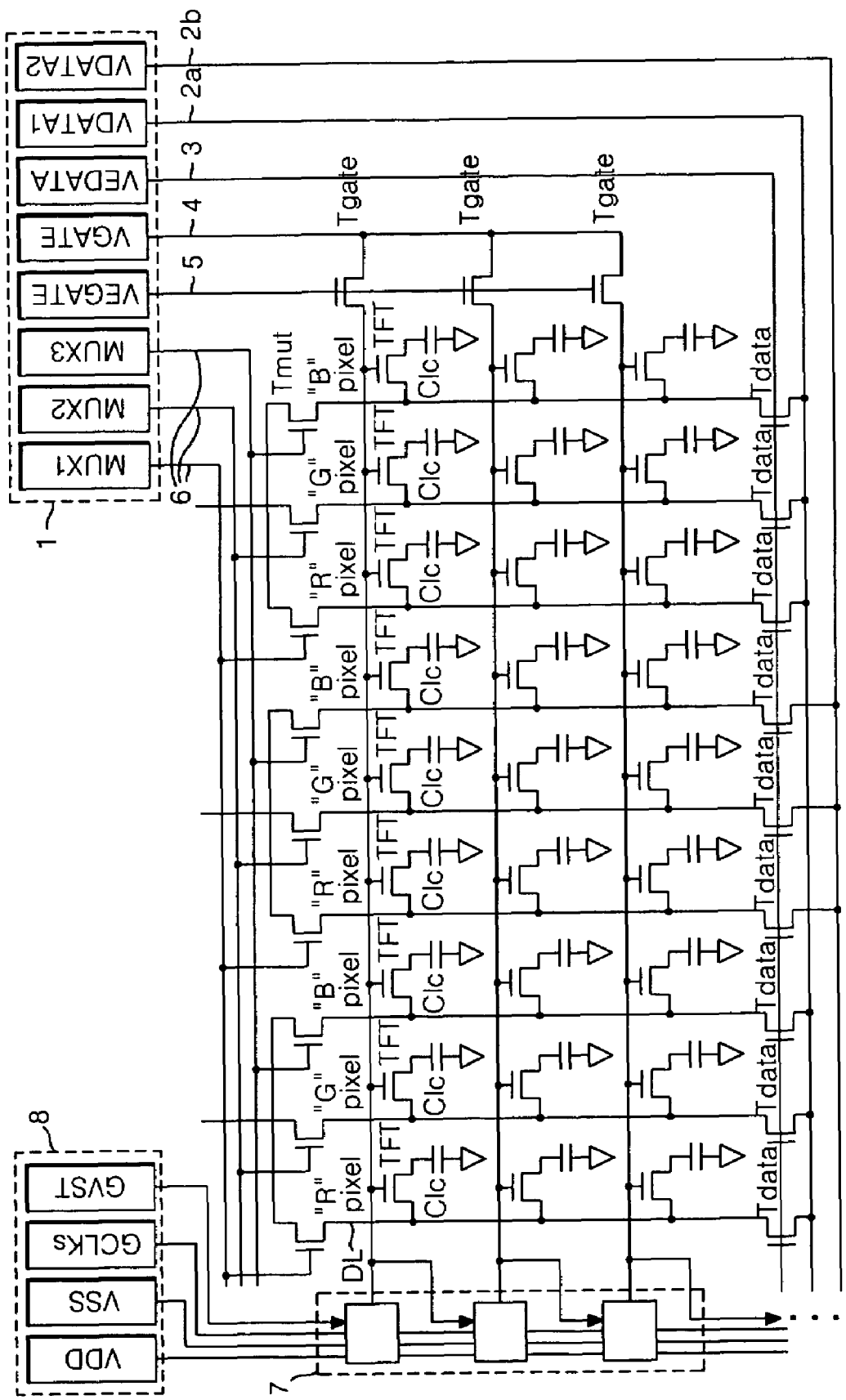
FIG. 4 is a plan view of a liquid crystal display panel according to an embodiment of the present invention.

As shown in FIG. 4, a liquid crystal display panel according to an embodiment of the present invention includes a pixel matrix array where a plurality of data lines DL and a plurality of gate lines GL cross each other, a plurality of cell TFT's are arranged adjacent to the crossings, and liquid crystal cells are arranged in a matrix shape; a data switching TFT Tdata connected to a lower end of each data line DL; a gate TFT Tgate connected to a one end of the gate line GL; a gate drive circuit 7 in a TCP or COG form connected to the other end of the gate lines GL; and a set of external contact pads 1 for receiving test signals from an inspection jig.

The set of external contacts pad 1 includes a MUX1 pad, a MUX2 pad and a MUX3 pad for controlling a Tmux; a VEGATE pad for supplying a voltage to a gate terminal of the Tgate; a VGATE pad for supplying a gate high voltage and a gate low voltage to a source terminal of the Tgate; a VEDATA pad for supplying a voltage to a gate terminal of the Tdata; and a VDATA1 pad and a VDATA2 pad divided into two for supplying a test data voltage to source terminals of the Tdatas.

The gate drive circuit 7 includes a shift register having a level shifter for shifting a swing width of a scan pulse to a level suitable for driving the liquid crystal cell Clc and an output buffer. The gate drive circuit 7 receives a high potential power supply voltage VDD, a low potential power supply voltage VSS, clock signals GCLKS and a stat pulse GVST through a gate pad group 8 to supply a scan pulse of gate high voltage to the gate line GL, thereby turning on the cell TFTs connected to the gate line GL to select the liquid crystal cells Clc of one horizontal line in which the data is to be displayed.

The substrate of the liquid crystal display panel includes first external wire lines 6 for connecting the MUX1 pad, MUX2 pad and MUX3 pad to a gate terminals of the Tmuxs: a second external wire line 5 for connecting the VEGATE pad to a gate terminal of the Tgate; a third control wire line 4 for connecting the VGATE pad to a source terminal of the Tgate; a third external wire line for connecting the VEDATA to a gate terminal of the Tdata; a fourth external wire line 2A for connecting the VDATA1 pad to source terminals of Tdatas on the sides of the liquid crystal display panel that are connected to the data lines DL on the sides of the liquid crystal display panel; and a fifth external wire line 2B for connecting the VDATA2 pad to a source terminal of Tdatas at the middle of the liquid crystal display panel that are connected to middle data lines DL within the pixel matrix.

In order to inspect an expressive capacity of each gray level, a test jig supplies the same test gray level data to the VDATA1 pad and the VDATA2 pad. And, in order to select a horizontal line to which the test gray level data are supplied, the Tgate is turned on by a gate high voltage and a gate control voltage generated from the test jig or the gate high voltage is sequentially supplied to the gate lines GL by the gate drive circuit. Then, the liquid crystal cells within the pixel matrix displays the test gray level data, and an expressive capacity of the light output is automatically detected with an image pickup device or inspected with a naked eye.

Figure 5:
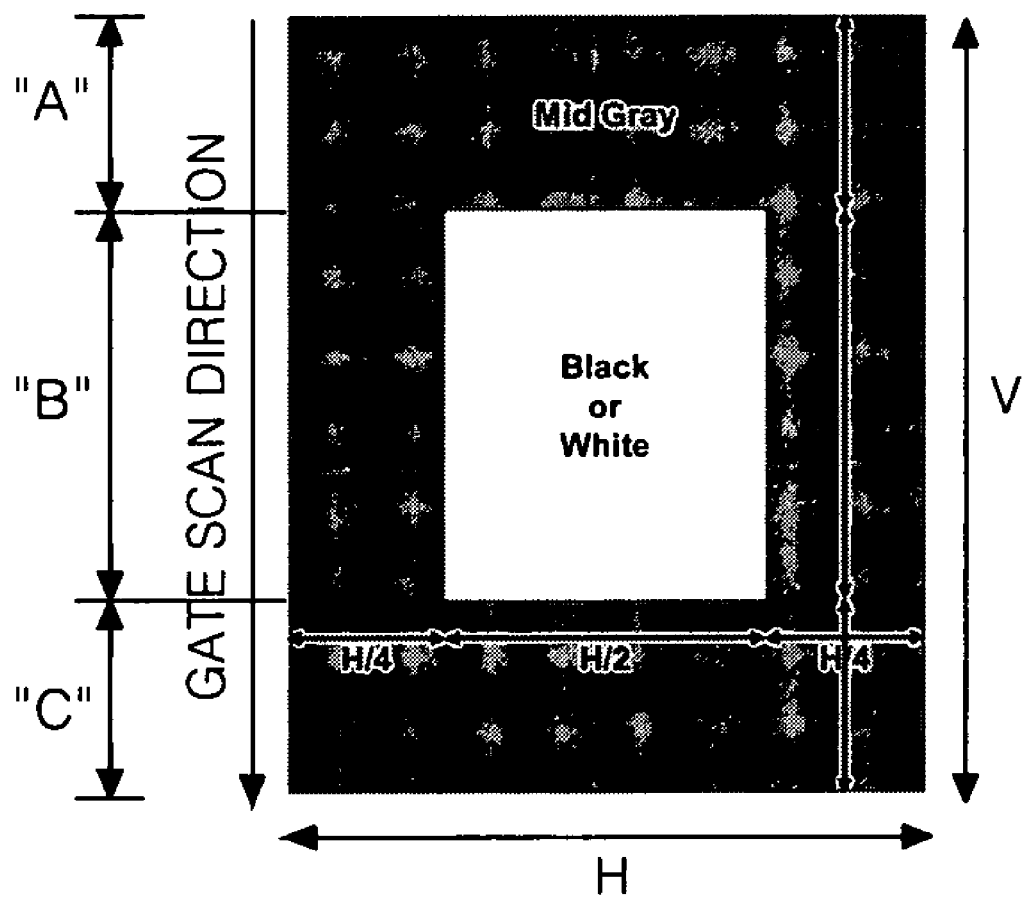
FIG. 5 is a diagram representing a test window pattern according to an embodiment of the present invention.

The test cross-talk data for the cross-talk inspection is generated in a window pattern as shown in FIG. 5. The "V" in FIG. 5 represents a vertical direction and the "H" represents a horizontal direction. In the case of a line inversion driving, a driving waveform of the test cross-talk data of FIG. 5 is shown in FIG. 6. The line inversion driving supplies the data of the same polarity to the liquid crystal cells of the same horizontal line, but on the other hand, it supplies the data of polarities which are different from each other to the liquid crystal cells of the adjacent horizontal lines. In the line inversion driving, an AC common voltage VCOM is supplied to a common electrode which faces a pixel electrode of the liquid crystal cell. In case of a dot inversion driving, a driving waveform of the test cross-talk data of FIG. 5 is shown in FIG. 7. In the dot inversion driving, the data of which the polarities are different from each other are supplied to the liquid crystal cells of adjacent vertical lines, and the data of which the polarities are different from each other is supplied to the liquid crystal cells of adjacent horizontal lines. In the dot inversion driving, the common voltage VCOM is generated in a direct current.

For the cross-talk inspection, the test jig supplies the same mid gray level data (a mid gray level of A and C areas) to the VDATA1 pad and the VDATA2 pad in the liquid crystal cells Clc of the edge of the pixel matrix while the test jig supplies the peak white or peak black data (B area) to the VDATA2 pad in the middle part liquid crystal cells Clc of the pixel matrix. In order to select the horizontal line to which the test gray level data is supplied, the gate high voltage is sequentially supplied to the gate lines GL by the gate drive circuit. Then, the liquid crystal cells within the pixel matrix display a window pattern, as shown in FIG. 5, and the light output is automatically detected by the image pickup device or the expressive capacity of each gray level is inspected with a naked eye.

In the end, according to embodiments of the present invention, the inspection can be done without the data drive circuit even when inspecting the cross-talk as well as when assessing the expressive capacity of each gray level. After the inspection, the set of external contact pads 1 and the external wire lines 2A to 6 can be removed by a scribing. As described above, the liquid crystal display device and the inspecting method thereof according to embodiments of the present invention supplies the data voltages, which are different from each other, to the pixel matrix array through a separate external pad and wire line for the middle portion of the pixel matrix display, thereby making it possible to prevent the waste of a data drive circuit.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device with data switching thin film transistors for inspection, comprising:
    a pixel matrix where a plurality of gate lines and a plurality of data lines cross each other and a plurality of liquid crystal cells are arranged;
    first data switching thin film transistors respectively and directly connected to data lines of a first data line group of the data lines and directly connected to a first external wire connected to a first external pad; and
    second data switching thin film transistors respectively and directly connected to data lines of a second data line group of the data lines and directly connected to a second external wire connected to a second external pad;
    wherein the first group of data lines are a bunch of adjacent data lines in the middle of the pixel matrix and the second group of data lines are two bunches of adjacent data lines on either sides of the first group of data lines, and
    wherein a first data is supplied to liquid crystal cells of the middle of the pixel matrix by the first data switching thin film transistors and a second data is supplied to liquid crystal cells of the sides of the pixel matrix by the first and second data switching thin film transistors when inspecting cross-talk.

2. The liquid crystal display device according to claim 1, further comprising: gate line driving thin film transistors respectively connected to the gate lines.

3. The liquid crystal display device according to claim 2, wherein the gate line driving thin film transistors and the first and second data switching thin film transistors are formed on the same substrate.

4. The liquid crystal display device according to claim 1, wherein the first group of data lines are configured so that the first group of data lines can become connected together and the second group of data lines are configured so that the second group of data lines can become connected together.

5. A liquid crystal display device, comprising:
a pixel matrix where a plurality of gate lines and a plurality of data lines having first and second groups cross each other and a plurality of liquid crystal cells are arranged;
a gate drive circuit for supplying a scan pulse to the gate lines;
first data switching thin film transistors respectively and directly connected to the first group of the data lines;
second data switching thin film transistors respectively and directly connected to the second group of the data lines;
a first external wire line connected to data input terminals of the first data switching thin film transistors;
a second external wire line connected to data input terminals of the second data switching thin film transistors;
a third external wire line connected to control terminals of the first and second data switching thin film transistors;
a first external pad connected to the first external wire line;
a second external pad connected to the second external wire line; and
a third external pad for supplying control data to the third external wire line;
wherein the first group of data lines are a bunch of adjacent data lines in the middle of the pixel matrix and the second group of data lines are two bunches of adjacent data lines on either sides of the first group of data lines, and
wherein a first data is supplied to liquid crystal cells of the middle of the pixel matrix by the first data switching thin film transistors and a the second data is supplied to liquid crystal cells of the sides of the pixel matrix by the first and second data switching thin film transistors when inspecting cross-talk, and
wherein the first data switching thin film transistors are directly connected to the first external wire connected to the first external pad, and the second data switching thin film transistors are directly connected to the second external wire connected to the second external pad.

6. The liquid crystal display device according to claim 5, further comprising:
gate line driving thin film transistors respectively connected to the gate lines;
a fourth external wire line connected to the input terminals of the gate line driving thin film transistors;
a fifth external wire line connected to the control terminals of the gate driving thin film transistors;
a fourth external pad for supplying a gate voltage to the fourth external wire line; and
a fifth external pad for supplying a control signal to the fifth external wire line.

7. The liquid crystal display device according to claim 6, wherein the data switching thin film transistors, the gate line driving thin film transistors, the external wire lines and the external pads are formed on the same substrate.

8. The liquid crystal display device according to claim 5, wherein the first group of data lines are configured so that the first group of data lines can become connected together and the second group of data lines are configured so that the second group of data lines can become connected together.

* * * * *